US008006062B1

(12) United States Patent  
Cheng et al.

(10) Patent No.: US 8,006,062 B1  
(45) Date of Patent: Aug. 23, 2011

(54) APPARATUS, SYSTEM, AND METHOD FOR EXTENDED SERIAL PRESENCE DETECT FOR MEMORY PERFORMANCE OPTIMIZATION

(75) Inventors: Tony Yuhsiang Cheng, Union City, CA (US); Hon Fei Chong, Campbell, CA (US); Benjamin Dodge, San Jose, CA (US); Howard Tsai, Cupertino, CA (US); Tsungyi Lin, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 632 days.

(21) Appl. No.: 12/118,176

(22) Filed: May 9, 2008

Related U.S. Application Data

(60) Provisional application No. 60/917,303, filed on May 10, 2007.

(51) Int. Cl.  
*G06F 12/00* (2006.01)

(52) U.S. Cl. . 711/170; 711/104; 711/156; 711/E12.001; 713/1

(58) Field of Classification Search .................. None  
See application file for complete search history.

(56) References Cited

U.S. PATENT DOCUMENTS

| | | | | |
|---|---|---|---|---|
| 5,524,232 A * | 6/1996 | Hajeer | .......................... | 711/115 |
| 2001/0000822 A1* | 5/2001 | Dell et al. | ..................... | 711/170 |
| 2003/0179598 A1* | 9/2003 | Chen | .............................. | 365/63 |
| 2006/0047892 A1* | 3/2006 | Lin et al. | ........................ | 711/105 |
| 2006/0083093 A1* | 4/2006 | Dover et al. | .................. | 365/222 |
| 2007/0058470 A1* | 3/2007 | Nierle et al. | .................. | 365/221 |
| 2007/0246257 A1* | 10/2007 | Muff et al. | .................... | 174/541 |
| 2008/0130343 A1* | 6/2008 | Janzen et al. | .................. | 365/51 |
| 2009/0034342 A1* | 2/2009 | Miyamoto et al. | ......... | 365/189.2 |

OTHER PUBLICATIONS

Tweakguides "ATI Catalyst Tweak Guide [p. 9] Advanced Tweaking", Apr. 2004, www.tweakguides.com/ATICAT_9.html.*  
PC2-4200/PC2-3200 DDR2 Unbuffered MicroDIMM, Reference Design Specification, JEDEC Standard No. 21C, Rev. 0.5, Apr. 26, 2004, 28 pages.  
PC2-4200/PC2-3200 DDR2 Registered Mini-DIMM, Design Specification, JEDEC Standard No. 21C, Rev. 2.0, Aug. 2006, 48 pages.

* cited by examiner

*Primary Examiner* — Pierre-Michel Bataille  
*Assistant Examiner* — Ralph A Verderamo, III  
(74) *Attorney, Agent, or Firm* — Cooley LLP

(57) ABSTRACT

A computing system has a mode of operation in which at least two different memory parameter profiles are read by a BIOS to configure memory. In one implementation the memory parameter profiles are stored in a serial presence detect memory using an extended serial presence detect format.

18 Claims, 7 Drawing Sheets

| Description | Data Type | Address Map Byte # |
|---|---|---|
| SPD size | LUT Entry | 0 |
| Total SPD memory size | LUT Entry | 1 |
| Fundamental memory type | LUT Entry, Appendix A | 2 |
| Definition of features specific to the fundamental memory | See pertinent appendix | 3-XX |
| (Optional) Superset memory type | See appendix B | XX-60 |
| (Optional) definition of features specific to the superset memory | See pertinent appendix | 33-61 |
| SPD Revision designator | LUT | 62 |
| Checksum for bytes 0-62 | Checksum | 63 |
| Manufacturers Jadec ID code per JEP-106 | LUT | 64-71 |
| Manufacturing location | Supplier Unique | 72 |
| Manufacturer's Part Number | Supplier Unique | 73-90 |
| Revision Code | Supplier Unique | 91-92 |
| Manufacturing date | BCD | 93-94 |
| Assembly Serial Number | Supplier Unique | 95-98 |
| Manufacturer Specific Data | Supplier Unique | 99-125 |
| Reserved | N/A | 126-127 |
| Open free-form area | Application Specific | 128-255 |

*FIG. 1* (Prior Art)

| SPD Version | Profile | Description | Example | Bytes |
|---|---|---|---|---|
| A1 | Profile 0 | Lowest Latency in 1T mode | DDR750 CAS 3 | 104-109 |
| A1 | Profile 1 | Highest Frequency in 1T mode | DDR900 CAS 4 | 110-115 |
| A1 | Profile 2 | Lowest Latency in 2T mode | DDR1000 CAS 4 | 116-121 |
| A1 | Profile 3 | Highest Frequency in 2T mode | DDR1066 CAS 5 | 122-127 |

*FIG. 3A*

| Byte Number | Bit Field | Profile Number | Description | * |
|---|---|---|---|---|
| 99-101 | 7:0 | Global | Tritium Support String | |
| 102 | 7:0 | Global | Tritium SPD Version Field | |
| 103 | 1:0 | Global | Profile for Optimal Performance | |
| 103 | 7:4 | Global | Profile Enables | |
| 104 | 6:0 | 0 | Voltage Level | |
| 104 | 7 | 0 | Address Cmd Rate | |
| 105 | 7:0 | 0 | Minimum Cycle time at Supported CAS Latency | 9 |
| 106 | 7:0 | 0 | CAS Latency | 18 |
| 107 | 7:0 | 0 | Minimum RAS to CAS delay (tRCD) | 29 |
| 108 | 7:0 | 0 | Minimum Row Precharge Time (tRP) | 27 |
| 109 | 7:0 | 0 | Minimum Active to Precharge Time (tRAS) | 30 |
| 110 | 6:0 | 1 | Voltage Level | |
| 110 | 7 | 1 | Address CMD Rate | |
| 111 | 7:0 | 1 | Minimum Cycle time at Supported CAS Latency | 9 |
| 112 | 7:0 | 1 | CAS Latency | 18 |
| 113 | 7:0 | 1 | Minimum RAS to CAS delay (tRCD) | 29 |
| 114 | 7:0 | 1 | Minimum Row Precharge Time (tRP) | 27 |
| 115 | 7:0 | 1 | Minimum Active to Precharge Time (tRAS) | 30 |
| 116 | 6:0 | 2 | Voltage Level | |
| 116 | 7 | 2 | Address CMD Rate | |
| 117 | 7:0 | 2 | Minimum Cycle time at Supported CAS Latency | 9 |
| 118 | 7:0 | 2 | CAS Latency | 18 |
| 119 | 7:0 | 2 | Minimum RAS to CAS delay (tRCD) | 29 |
| 120 | 7:0 | 2 | Minimum Row Precharge Time (tRP) | 27 |
| 121 | 7:0 | 2 | Minimum Active to Precharge Time (tRAS) | 30 |
| 122 | 6:0 | 3 | Voltage Level | |
| 122 | 7 | 3 | Address CMD Rate | |
| 123 | 7:0 | 3 | Minimum Cycle time at Supported CAS Latency | 9 |
| 124 | 7:0 | 3 | CAS Latency | 18 |
| 125 | 7:0 | 3 | Minimum RAS to CAS delay (tRCD) | 29 |
| 126 | 7:0 | 3 | Minimum Row Precharge Time (tRP) | 27 |
| 127 | 7:0 | 3 | Minimum Active to Precharge Time (tRAS) | 30 |

*FIG. 3B*

| SPD Version | Profile | Description | Example | Bytes |
|---|---|---|---|---|
| B1 | Profile 0 | High Performance | DDR900 CAS 4 | 104-115 |
| B1 | Profile 1 | High Frequency | DDR1066 CAS 5 | 116-127 |

*FIG. 4A*

| Byte Number | Bit Field | Profile Number | Description | * |
|---|---|---|---|---|
| 99-101 | 7:0 | Global | Tritium Support String | |
| 102 | 7:0 | Global | Tritium SPD Version Field | |
| 103 | 1:0 | Global | Profile for Optimal Performance | |
| 103 | 5:4 | Global | Profile Enables | |
| 104 | 6:0 | 0 | Voltage Level | |
| 104 | 7 | 0 | Address Cmd Rate | |
| 105 | 1:0 | 0 | Address Drive Strength | |
| 105 | 3:2 | 0 | Chip Select Drive Strength | |
| 105 | 5:4 | 0 | Clock Drive Strength | |
| 105 | 7:6 | 0 | Data Drive Strength | |
| 106 | 1:0 | 0 | DQS Drive Strength | |
| 107 | 4:0 | 0 | Address/Command Fine Delay | |
| 107 | 5 | 0 | Address/Command Setup Time | |
| 108 | 4:0 | 0 | Chip Select Delay | |
| 108 | 5 | 0 | Chip Select Setup Time | |
| 109 | 7:0 | 0 | Minimum Cycle time at Supported CAS Latency | 9 |
| 110 | 7:0 | 0 | CAS Latency | 18 |
| 111 | 7:0 | 0 | Minimum RAS to CAS delay (tRCD) | 29 |
| 112 | 7:0 | 0 | Minimum Row Precharge Time (tRP) | 27 |
| 113 | 7:0 | 0 | Minimum Active To Precharge Time (tRAS) | 30 |
| 114 | 7:0 | 0 | Write Recovery Time (tWR) | 36 |
| 115 | 7:0 | 0 | Minimum Active to Active/Refresh Time (tRC) | 41 |
| 116 | 6:0 | 1 | Voltage Level | |
| 116 | 7 | 1 | Address Cmd Rate | |
| 117 | 1:0 | 1 | Address Drive Strength | |
| 117 | 3:2 | 1 | Chip Select Drive Strength | |
| 117 | 5:4 | 1 | Clock Drive Strength | |
| 117 | 7:6 | 1 | Data Drive Strength | |
| 118 | 1:0 | 1 | DQS Drive Strength | |
| 119 | 4:0 | 1 | Address/Command Fine Delay | |
| 119 | 5 | 1 | Address/Command Setup Time | |
| 120 | 4:0 | 1 | Chip Select Delay | |
| 120 | 5 | 1 | Chip Select Setup Time | |
| 121 | 7:0 | 1 | Minimum Cycle time at Supported CAS Latency | 9 |
| 122 | 7:0 | 1 | CAS Latency | 18 |
| 123 | 7:0 | 1 | Minimum RAS to CAS delay (tRCD) | 29 |
| 124 | 7:0 | 1 | Minimum Row Precharge Time (tRP) | 27 |
| 125 | 7:0 | 1 | Minimum Active To Precharge Time (tRAS) | 30 |
| 126 | 7:0 | 1 | Write Recovery Time (tWR) | 36 |
| 127 | 7:0 | 1 | Minimum Active to Active/Refresh Time (tRC) | 41 |

APPARATUS, SYSTEM, AND METHOD FOR EXTENDED SERIAL PRESENCE DETECT FOR MEMORY PERFORMANCE OPTIMIZATION

CROSS REFERENCE TO RELATED APPLICATIONS

The present application claims the benefit of U.S. provisional application No. 60/917,303, which was filed on May 10, 2007, the contents of which are hereby incorporated by reference.

FIELD OF THE INVENTION

The present application is generally related to serial presence detect techniques for memory modules. More particularly, the present application is directed towards extending the capabilities of serial presence detect techniques.

BACKGROUND OF THE INVENTION

One issue that arises is modern computing systems is that many different types of memory modules can be used. Each different type of memory module may have different random access memory (RAM) parameters that have to be accounted for. As a consequence, it is desirable for a host system to have the capability to detect the presence of memory modules. The Serial Presence Detect (SPD) standard was developed by the Joint Electron Device Engineering Council (JEDEC) and is described in JEDEC Standard No. 21-C. The SPD standard implements presence detection serially using an address map specified by the SPD standard.

A memory module compliant with the SPD standard holds the SPD data in a non-volatile memory, such as an 8-pin serial Read Only Memory (ROM) or Electronically Erasable Programmable Read Only Memory (EEPROM). During a startup of a computer, the BIOS of the host system serially reads the SPD memory parameters from the non-volatile memory and configures the system based on the SPD memory parameters. SPD data is arranged as table entries corresponding to positions on a look-up table specified by the JEDEC standard. A particular presence detect (PD) aspect may, for example, be represented by one or more bytes.

FIG. 1 illustrates an SPD content table described by JEDEC standard No. 21-C. JEDEC standard No. 21-C specifies SPD data types that include lookup table entries, binary data, optional data, and checksums. The lookup table entries include tRAC, tCAC, # of banks, number of row addresses, number of column addresses, error detection/correction, refresh rates, data width and interface standards.

One drawback with conventional SPD is that it is intended to statically fix the memory parameters to one set of parameters certain to work. In contrast, in many types of computing systems it is desirable to have the freedom to adjust memory timing parameters based on different considerations, needs, or preferences.

What is desired is an apparatus, system, and method to extend the capabilities of SPD for more complex memory applications.

SUMMARY OF THE INVENTION

A computing system utilizes at least two different stored memory parameter profiles for a BIOS to configure at least one memory module. In one embodiment the memory parameter profiles correspond to different system performance modes, such as different clocking modes, different voltage settings, different memory interleaving patterns, different paging formats, different gaming modes, or different power modes.

In one embodiment of an apparatus, a memory module includes a serial presence detect (SPD) memory storing an extended SPD format. The extended SPD format includes at least two different memory parameter profiles that the memory module supports.

In one embodiment of a system, the system includes at least one memory module operative to be configured by a memory controller to utilize at least two different memory parameter profiles. A memory stores the at least two different memory parameters. A system BIOS acts in response to a setup command to read the memory and select a memory parameter profile for a performance mode. The selected memory parameter profile is used by the system to configure the memory controller for the performance mode.

In one embodiment of a method, a BIOS setup command is received to customize memory for a performance mode of the computing system. In response to the BIOS setup command, a memory parameter profile for the performance mode is read that is selected from a plurality of stored memory parameter profiles. A memory controller is configured to utilize the selected memory parameter profile to access a memory module.

BRIEF DESCRIPTION OF THE FIGURES

The invention is more fully appreciated in connection with the following detailed description taken in conjunction with the accompanying drawings, in which:

FIG. 1 is a prior art diagram of a conventional serial presence detect address map;

FIGS. 3A-3B illustrates an exemplary extended serial presence detect format address map in accordance with one embodiment of the present invention; and FIGS. 4A-4B illustrate an exemplary extended serial presence detect format address map in accordance with one embodiment of the present invention.

Like reference numerals refer to corresponding parts throughout the several views of the drawings.

DETAILED DESCRIPTION OF THE INVENTION

Figure 2A:
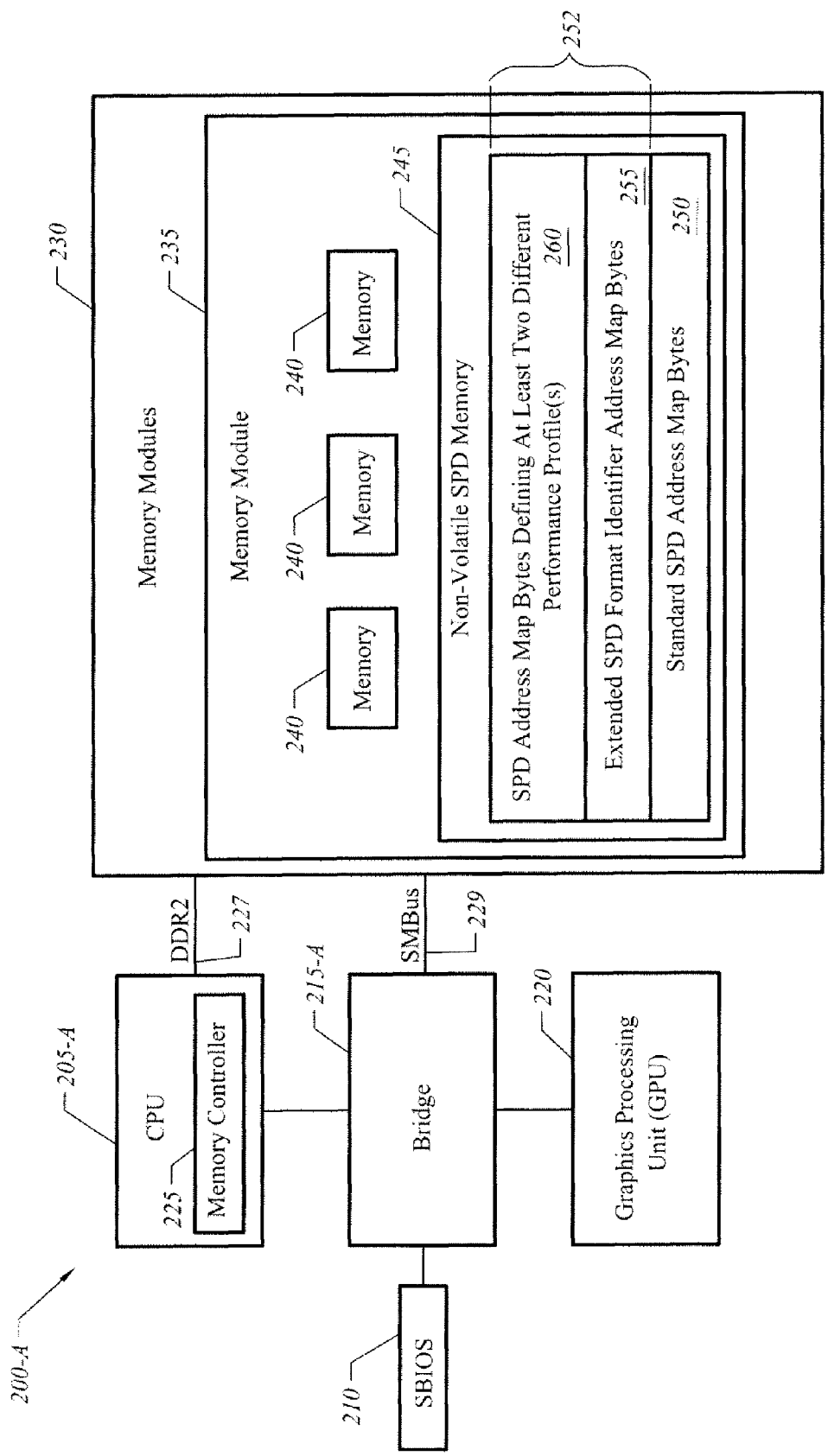
FIGS. 2A-2B illustrate a system in accordance with embodiments of the present invention.
Figure 2B:
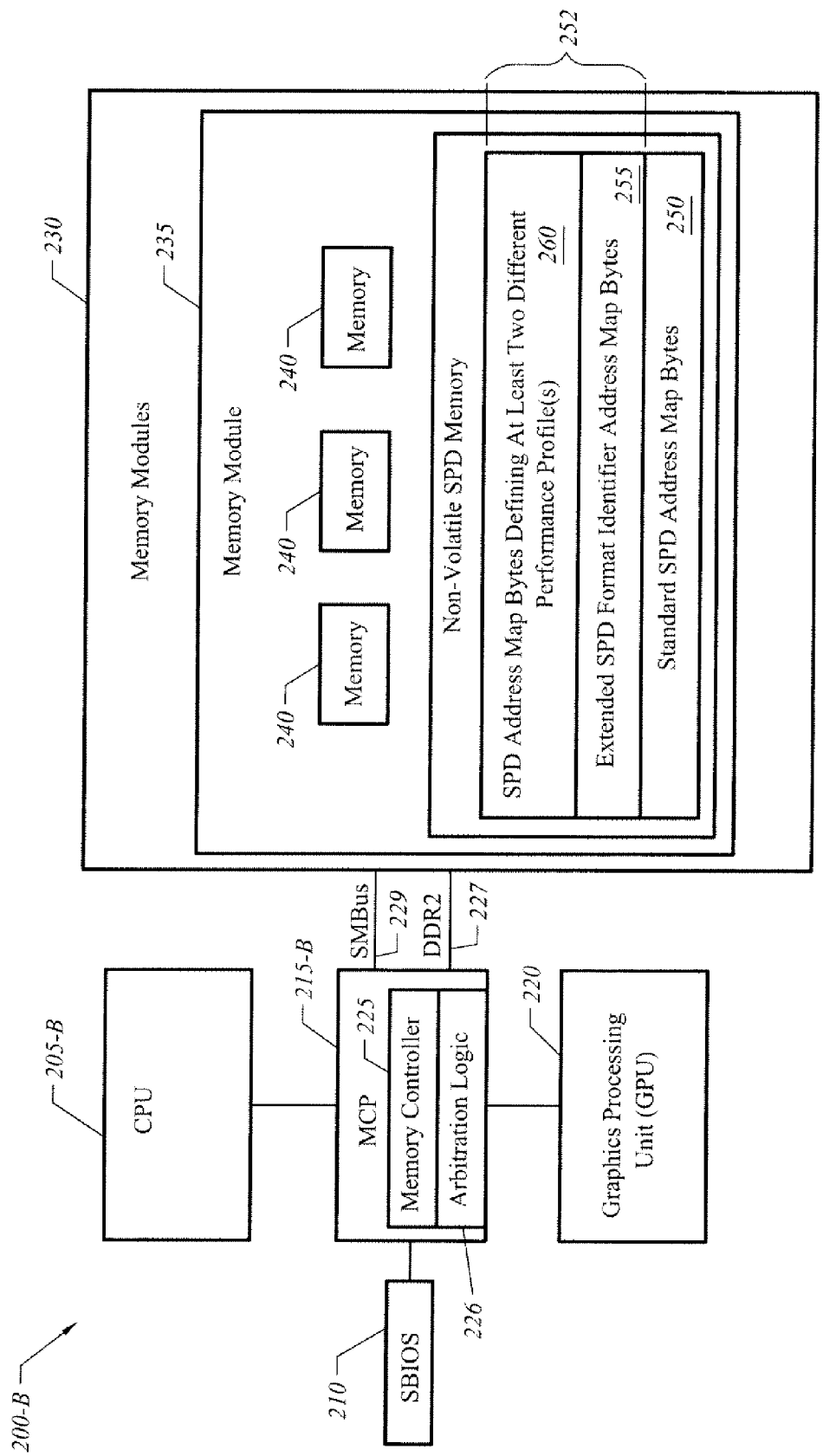

FIGS. 2A and 2B illustrate embodiments of an exemplary computing system 200 in accordance with one embodiment of the present invention. Computing system 200-A and 200-B includes a central processing unit (CPU) 205, a system basic input/out system (SBIOS) non-volatile memory 210 to store BIOS configuration data for a BIOS program, a bridging unit 215, such as a conventional bridge or a media and communications processor (MCP) unit, and at least one graphics processing unit 220. MCPs are available from the Nvidia Corporation of Santa Clara, Calif. Some type of CPUs include a memory controller functionality built into the CPU. Thus, depending upon the CPU architecture implementation, a memory controller 225 may be implemented in different portions of the system, such as in a CPU, bridge, or an MCP. This results in different possible connections between the CPU and the system memory, as illustrated in FIGS. 2A and 2B.

A system memory 230 is formed of individual memory modules 235 that are coupled to the system via appropriate buses 227, such as double data rate two (DDR2) dynamic random access memory buses, with the precise bus configuration being dependent upon the CPU architecture. A system management bus (SMBus) 229 is provided as a serial interface for memory management of memory modules 230. An individual memory module 235 includes a plurality of random access memory chips 240. A serial presence detect (SPD) memory 245 is provided in each memory module 235. Each SPD memory 245 is a non-volatile memory, such as an EEPROM that may, for example, be encoded by a memory module provider. In one implementation, each memory module 235 is a Dual In-Line Memory Module (DIMM) having DDR2 memories, such as a system memory having four DIMMs utilizing dynamic random access memories accessed by a DDR2 bus.

The SPD memory 245 stores an extended SPD memory parameter format 252. The current version of the SPD standard has an address space with an address map that defines bytes 0 to 98. However, the SPD standard permits bytes 99 to 127 of the address space to be used for other purposes by a manufacturer. In one implementation, at least two different memory parameter profiles 260 are stored in the manufacturer's specific data area of the SPD address space (bytes 99-127) An additional support string and version field may be included in the address space as an identifier 255 (also within bytes 99 to 127) to facilitate a BIOS recognizing the extended SPD format. For example, a support string may be a field that describes whether a memory module adheres to a specific extended SPD memory parameter format. A version field may describe which extended SPD memory parameter format is supported. Thus, conceptually the address map of the SPD can be divided into standard SPD address map bytes 250 and also the address map bytes utilized for the extended SPD format 252 to store information for two or more different profiles 260 along with an identifier 255.

Note that the BIOS program for system 200 is preferably customized to read the identifier 255 and utilize the SPD profiles 260 i.e., the software associated with the BIOS requires the capability to interpret the extended SPD format 252. Thus, it is contemplated that a motherboard to implement system 200 would have memory modules, such as DIMMs, encoded by a manufacturer and that a custom BIOS 210 would be provided to utilize the extended SPD format. The BIOS 210 could, for example, determine common profiles supported by all of the DIMMs in the system after an initial query of all of the DIMMs.

Two exemplary address maps for the extended SPD format are illustrated in FIGS. 3A, 3B, 4A, and 4B. FIGS. 3A-3B illustrate an example in which four different profiles are supported in the SPD memory. As summarized in FIG. 3A, in one embodiment four profiles are supported corresponding to different frequency and latency modes. The 1T and 2T nomenclature refers to whether commands are sent on every clock edge or every-other clock edge. A full address map for the four profiles is illustrated in FIG. 3B. As summarized in FIG. 4A, in another embodiment two different profiles are supported in the SPD memory corresponding to a high performance mode and a high-frequency mode. FIG. 4B illustrates a full address map for the two profiles of FIG. 4A.

In one implementation, global field definitions common to different profiles are included in the address map for the extended SPD format. As illustrated in FIGS. 3B and 4B, in one embodiment global field definitions include a support string field, a version field specifying which profile should be loaded to maximize system performance, and a field specifying which profiles contain valid data.

In the implementation illustrated in FIGS. 3B and 4B, profile-specific description fields are included in the SPD address map for the extended format. As illustrated in FIGS. 3B and 4B, in one embodiment, profile-specific field definitions are included to specify a voltage level for each profile (such as voltage levels in increments between 1.8V to 2.5 V); specify an address command rate 310 (such as sending commands on every clock edge or on every other clock edge); specify an address drive strength; specify a chip select drive strength, specify a clock drive strength, specify a data drive strength, specify a DQS drive strength; specify an address/command fine delay with respect to a default setup time; specify an address/command setup time to define the default setup for address and command pins; specify a chip select fine delay defining how long the chip select and ODT pins are delayed with respect to the default setup time; and specify a chip select setup time field to define the default setup time for chip select and ODT pins. It will also be understood from FIGS. 3B and 4B that the extended format can be used to define clock speed, CAS latency, tRCD, tRP, tRAS, memory voltage, command rate drive strengths, fine delays, setup times, write recover time, and tRc.

The capability to store two or more different memory parameter profiles in a SPD memory may be used in many different ways. In one implementation, a memory parameter profile is a performance profile that corresponds to settings to optimize the use of memory for a particular performance mode of the computing system. That is, the selection of a particular memory parameter profile provides a memory boost that enhances the capability of the system to implement a particular performance mode. For example, in one embodiment the different performance profiles may correspond to a standard operating mode and an overclocking mode having a higher clock rate. In this example, the overclocking mode may have different voltage settings, clock rates, and memory timings than the standard operating mode. As another example, the different memory parameter profiles may correspond to memory parameters for different gaming modes, different memory interleaving patterns, different power modes (e.g., a normal mode and one or more power-savings modes); different voltage modes; different latency modes; different memory patterns if two or more GPUs are used in the computing system; or different paging algorithms. Note that the different performance modes of the system may relate to the way that the CPU, GPU, or the CPU and the GPU interact with memory. In one embodiment, an individual memory controller uses arbitration logic to arbitrate between CPU and non-CPU traffic and the attributes of the memory performance profiles are used to adjust the weights used by the memory controller to make arbitration choices.

In one embodiment, a user uses a menu-driven BIOS to initiate a BIOS setup command to configure the system to implement a particular performance mode for the system, such as overclocking. After the user makes a menu request, the BIOS reads the SPD memory. If the BIOS detects an appropriate string/version identifier, it then reads the SPD performance profiles 260 of the extended SPD format 252 from the SPD memory 245. The memory controller then configures the memory controller using the performance profiles read from the SPD memory. In one implementation a flag technique is used to trigger a read of the SPD memory. In this implementation, after a menu-request is made for a particular performance mode, the BIOS saves a flag into a non-volatile memory, such as a flash memory or other cache, to trigger a read of the SPD memory and adjustment of the memory controller during a reboot. As an illustrative example, in a system supporting overclocking an end-user is provided with a system BIOS menu option to setup overclocking. After the user has input the BIOS setup command, a flag is saved into flash and when the system reboots the system will overclock based on the memory parameters of the overclocking profile (e.g., clock, voltage, and other memory parameters) stored in the SPD memory.

One aspect of the present invention is that it permits memory modules, such as DIMMs, to act as multi-mode memory modules with the memory parameters of the memory module tuned based on the stored performance profile. This is particularly beneficial for computing systems in which memory can be optimized for different modes of the system. In contrast, conventional SPD supports only a single, fixed memory setting. In a preferred embodiment the different memory profiles are stored in a manufacturer specific data portion of an SPD memory. Consequently, a DIMM of the present invention can remain JEDEC complaint (in supporting conventional SPD) while also supporting additional memory parameter profiles customized for specific applications.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A memory module, comprising:
a plurality of random access memory chips; and
a serial presence detect (SPD) memory concurrently storing standard compliant configuration information and a pre-loaded extended SPD format, the extended SPD format including at least two different memory parameter profiles that the memory module supports for at least two different optimized memory modes.

2. The memory module of claim 1, wherein said extended SPD format further comprises an identifier for a BIOS to identify the extended SPD format.

3. The memory module of claim 1, wherein said extended SPD format is stored in a pre-selected portion of a memory address space of the SPD memory.

4. The memory module of claim 1, wherein said at least two different memory parameter profiles includes different voltage settings for different system modes.

5. The memory module of claim 1, wherein said at least two different memory parameter profiles include memory parameter profiles for normal clocking and for overclocking.

6. The memory module of claim 1, wherein said at least two different memory parameter profiles include memory parameter profiles for different paging algorithms.

7. The memory module of claim 1, wherein said at least two different memory parameter profiles include memory parameter profiles for different memory interleaving patterns.

8. The memory module of claim 1, wherein at least one memory parameter profile corresponds to a gaming mode of a graphics system.

9. A computing system, comprising:
a memory concurrently storing standard compliant configuration information and a pre-loaded extended format including at least two different memory parameter profiles for at least two different optimized memory modes, wherein the memory is a serial presence detect (SPD) memory of a memory module in the computing system storing an extended SPD format, the extended SPD format including the at least two different memory parameter profiles that the memory module supports; and
a system BIOS, the system BIOS in response to a setup command reading the SPD memory to select a memory parameter profile corresponding to an optimized memory mode, with the selected memory parameter profile being used by the system to configure a memory controller for the optimized memory mode.

10. The computing system of claim 9, wherein said at least two different memory parameter profiles includes different voltage settings for different system modes.

11. The computing system of claim 9, wherein said at least two different memory parameter profiles include memory parameter profiles for normal clocking and for overclocking.

12. The computing system of claim 9, wherein said at least two different memory parameter profiles include memory parameter profiles for different paging algorithms.

13. The computing system of claim 9, wherein said at least two different memory parameter profiles include memory parameter profiles for different memory interleaving patterns.

14. The computing system of claim 9, wherein at least one memory parameter profile corresponds to a gaming mode of a graphics system.

15. A method of configuring memory in a computing system, comprising:
receiving a BIOS setup command to customize a memory module for a performance mode of the computing system, the memory module comprising a serial presence detect memory concurrently storing standard compliant configuration information and an extended format including at least two different memory parameter profiles for at least two different optimized memory modes;
responsive to the BIOS setup command, reading a memory parameter profile for the performance mode that is selected from the at least two different memory parameter profiles used to invoke a corresponding plurality of optimized memory modes; and configuring a memory controller to utilize the selected memory parameter profile.

16. The method of claim 15, wherein said reading further comprises reading an identifier to confirm that the serial presence detect memory supports the extended format.

17. The method of claim 15, wherein the BIOS setup command corresponds to selecting between a normal clock rate and overclocking and said extended format including a normal memory parameter profile and at least one memory parameter profile to support overclocking.

18. The method of claim 17, wherein the at least two different memory parameter profiles includes at least two different operating voltages such that the operating voltage is reset to support overclocking.

* * * * *